United States Patent
Bromann et al.

(10) Patent No.: US 10,445,221 B2
(45) Date of Patent: Oct. 15, 2019

(54) AUTOMATED APPLICATION TESTING SYSTEM

(71) Applicant: Sauce Labs Inc., San Francisco, CA (US)

(72) Inventors: Christian Bromann, Berlin (DE); Yaroslav Borets, San Francisco, CA (US); Yeh Fang, San Francisco, CA (US); Bradley Scott Adelberg, Portola Valley, CA (US)

(73) Assignee: Sauce Labs Inc., San Francisco, CA (US)

( * ) Notice: Subject to any disclaimer, the term of this patent is extended or adjusted under 35 U.S.C. 154(b) by 0 days.

(21) Appl. No.: 15/916,136

(22) Filed: Mar. 8, 2018

(65) Prior Publication Data
US 2019/0278696 A1   Sep. 12, 2019

(51) Int. Cl.
*G06F 9/44* (2018.01)
*G06F 11/36* (2006.01)
*H04L 29/08* (2006.01)
*H04L 12/911* (2013.01)

(52) U.S. Cl.
CPC ...... *G06F 11/3664* (2013.01); *G06F 11/3688* (2013.01); *G06F 11/3692* (2013.01); *H04L 47/82* (2013.01); *H04L 67/02* (2013.01); *H04L 67/141* (2013.01)

(58) Field of Classification Search
CPC ............. G06F 11/3664; G06F 11/3688; G06F 11/3692; H04L 47/82; H04L 67/02; H04L 67/141
USPC .................................................. 717/127–139
See application file for complete search history.

(56) References Cited

U.S. PATENT DOCUMENTS

| | | | |
|---|---|---|---|
| 5,027,343 A * | 6/1991 | Chan | H04L 1/24 370/250 |
| 6,662,312 B1 | 12/2003 | Keller et al. | |
| 7,426,565 B1 | 9/2008 | Tormasov et al. | |
| 7,664,993 B2 * | 2/2010 | Alladi | G06F 11/2294 714/44 |
| 8,776,028 B1 * | 7/2014 | Enakiev | G06F 11/3664 714/38.11 |
| 9,075,914 B2 | 7/2015 | Huggins | |

(Continued)

FOREIGN PATENT DOCUMENTS

DE   10 2012 223 587   7/2014

OTHER PUBLICATIONS

Micro Focus, "Silk Test 17.0", May 2016, Retrieved from www.microfocus.com, 248 pages (Year: 2016).*

(Continued)

*Primary Examiner* — Ted T. Vo
(74) *Attorney, Agent, or Firm* — Weaver Austin Villeneuve & Sampson LLP

(57) ABSTRACT

Methods and apparatus are described by which a rich, time-correlated information set is captured during automated testing of an application in a way that allows the application developer to understand the state of the application under test (AUT), the browser interacting with the AUT, and/or the device interacting with the AUT, as it/they changed over time. Mechanisms or features associated with browsers and/or device operating systems are exploited to capture such information, not only for the purpose of better understanding individual test runs, but also to enable the use of analytics over data sets.

22 Claims, 3 Drawing Sheets

(56) References Cited

U.S. PATENT DOCUMENTS 9,170,847 B2 10/2015 Huggins et al.
2015/0058459 A1 2/2015 Amendjian et al.

OTHER PUBLICATIONS

Micro Focus, "Silk Test 18.5", Oct. 2017, Retrieved from www.microfocus.com, 20 pages (Year: 2017).*
Stewart, et al., "WebDriver: W3C Candidate Recommendation," https://w3c.github.io/webdriver/webdriver-spec.html, Feb. 14, 2018, 154 pages.
PCT International Search Report and Written Opinion, dated Jun. 13, 2019, issued in PCT/US2019/020027.

* cited by examiner

AUTOMATED APPLICATION TESTING SYSTEM

BACKGROUND

The testing of software applications has become a critical bottleneck in the pipeline between developers and end users. The diversity of devices, operating systems, and web browsers, coupled with the rapid pace at which new versions of each become available, makes it extremely difficult to ensure compatibility and reliable operation of a new application with a significant portion of the possible combinations in a timely manner.

SUMMARY

According to various implementations, methods, apparatus, and computer program products are provided that support automated testing of applications. According to a first class of implementations, a request is received for initiation of a test of an application under test (AUT). A plurality of resources is allocated for the test. The resources include a plurality of virtual computing environment instances. Each virtual computing environment (VCE) instance corresponds to one of a plurality of device operating systems (OSs). A plurality of first communication links is established. Each of the first communication links is between a corresponding one of the VCE instances and an instance of the AUT. A second communication link is established between a first VCE instance and a control/capture service (CCS) associated with the automated test platform. A plurality of test commands is received. The test commands are applied to each instance of the AUT using the corresponding VCE instance and the corresponding first communication link. Test results responsive to application of the test commands to each instance of the AUT with the corresponding VCE instance are received via the corresponding first communication link. Control commands are transmitted to the first VCE instance from the CCS via the second communication link. State information is received with the CCS from the first VCE instance via the second communication link. The state information represents one or more states associated with the first VCE instance and relates to the test of the corresponding instance of the AUT. For the first VCE instance, the test commands, the test results, and the state information are correlated to generate a correlated data set for the first VCE instance. The correlated data set for the first VCE instance is stored.

According to a particular implementation of the first class of implementations, the first VCE instance also corresponds to a web browser configured to interact with the corresponding instance of the AUT, and the state information includes a state of the web browser. According to a more specific implementation, the first device OS is a personal computer OS and the web browser is configured to operate with the personal computer OS. According to another more specific implementation, the control commands are applied to the web browser and the state of the web browser is received from the web browser via an application programming interface associated with the web browser.

According to another particular implementation of the first class of implementations, the first device OS is a mobile device OS, and the first VCE instance also corresponds to a hardware device configured to operate with the mobile device OS. According to a more specific implementation, the first VCE instance also corresponds to a web browser configured to interact with the corresponding instance of the AUT, and the state information includes a state of the web browser. According to another more specific implementation, the control commands are applied to the web browser and the state of the web browser is received from the web browser via an application programming interface associated with the web browser. According to another more specific implementation, the AUT is a native application configured to operate with the mobile device OS, and the state information includes one or both of a state of the native application or a state of the mobile device OS. According to another more specific implementation, the state information includes one or both of a state of the hardware device or a state of the mobile device OS.

According to another particular implementation of the first class of implementations, the first device OS is a mobile device OS, and the first VCE instance also corresponds to a mobile device emulator configured to emulate the mobile device OS. According to a more specific implementation, the first VCE instance also corresponds to a web browser configured to interact with the corresponding instance of the AUT, and the state information includes a state of the web browser. According to another more specific implementation, the control commands are applied to the web browser and the state of the web browser is received from the web browser via an application programming interface associated with the web browser. According to another more specific implementation, the AUT is a native application configured to operate with the mobile device OS, and the state information includes one or both of a state of the native application or a state of the mobile device OS. According to another more specific implementation, the state information includes one or both of a state of the mobile device emulator or a state of the mobile device OS.

According to another particular implementation of the first class of implementations, a portion of the correlated data set is transmitted to a remote developer device for presentation in a user interface of the remote developer device. Presentation of the correlated data set in the user interface of the remote developer device includes presentation of the test commands, the test results, and the state information of the correlated data set correlated at multiple points in time.

According to another particular implementation of the first class of implementations, the first VCE instance is a virtual machine or a container.

According to a second class of implementations, a first communication link to a virtual computing environment (VCE) instance is established for use in conjunction with a test of an application under test (AUT). The test of the AUT is conducted via a second communication link to the VCE instance. The VCE instance corresponds to a device OS. Control commands are transmitted to the VCE instance via the first communication link. State information is received from the VCE instance via the first communication link. The state information represents one or more states associated with the VCE instance and relates to the test of the AUT. The state information is correlated with test commands and test results transmitted via the second communication link to generate a correlated data set. The correlated data set is stored.

According to a particular implementation of the second class of implementations, the VCE instance also corresponds to a web browser configured to interact with the AUT, and the state information includes a state of the web browser. According to a more specific implementation, the device OS is a personal computer OS and the web browser is configured to operate with the personal computer OS.

According to another more specific implementation, the control commands are applied to the web browser and to the state of the web browser is received from the web browser via an application programming interface associated with the web browser.

According to another particular implementation of the second class of implementations, the device OS is a mobile device OS, and the VCE instance also corresponds to a hardware device configured to operate with the mobile device OS. According to a more specific implementation, the VCE instance also corresponds to a web browser configured to interact with the AUT, and the state information includes a state of the web browser. According to another more specific implementation, the control commands are applied to the web browser and the state of the web browser is received from the web browser via an application programming interface associated with the web browser. According to another more specific implementation, the AUT is a native application configured to operate with the mobile device OS, and the state information includes one or both of a state of the native application or a state of the mobile device OS. According to another more specific implementation, the state information includes one or both of a state of the hardware device or a state of the mobile device OS.

According to another particular implementation of the second class of implementations, the device OS is a mobile device OS, and the VCE instance also corresponds to a mobile device emulator configured to emulate the mobile device OS. According to a more specific implementation, the VCE instance also corresponds to a web browser configured to interact with the AUT, and the state information includes a state of the web browser. According to another more specific implementation, the control commands are applied to the web browser and the state of the web browser is received from the web browser via an application programming interface associated with the web browser. According to another more specific implementation, the AUT is a native application configured to operate with the mobile device OS, and the state information includes one or both of a state of the native application or a state of the mobile device OS. According to another more specific implementation, the state information includes one or both of a state of the mobile device emulator or a state of the mobile device OS.

According to another particular implementation of the second class of implementations, a portion of the correlated data set is transmitted to a remote developer device for presentation in a user interface of the remote developer device. Presentation of the correlated data set in the user interface of the remote developer device includes presentation of the test commands, the test results, and the state information of the correlated data set correlated at multiple points in time.

According to another particular implementation of the second class of implementations, the VCE instance is a virtual machine or a container.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

The present disclosure describes techniques by which a rich, time-correlated information set may be captured during automated testing of an application in a way that allows the application developer to understand the state of the application under test (AUT), the browser interacting with the AUT, and/or the virtual resources or devices interacting with the AUT, as it and/or they changed over time, and to therefore have a deeper understanding of test results. As will be described, various mechanisms associated with browsers and/or device operating systems are exploited to capture such information in parallel with the automated testing, not only for the purpose of better understanding individual test runs, but also to support the identification of patterns or trends over data sets representing many test runs.

Figure 1:
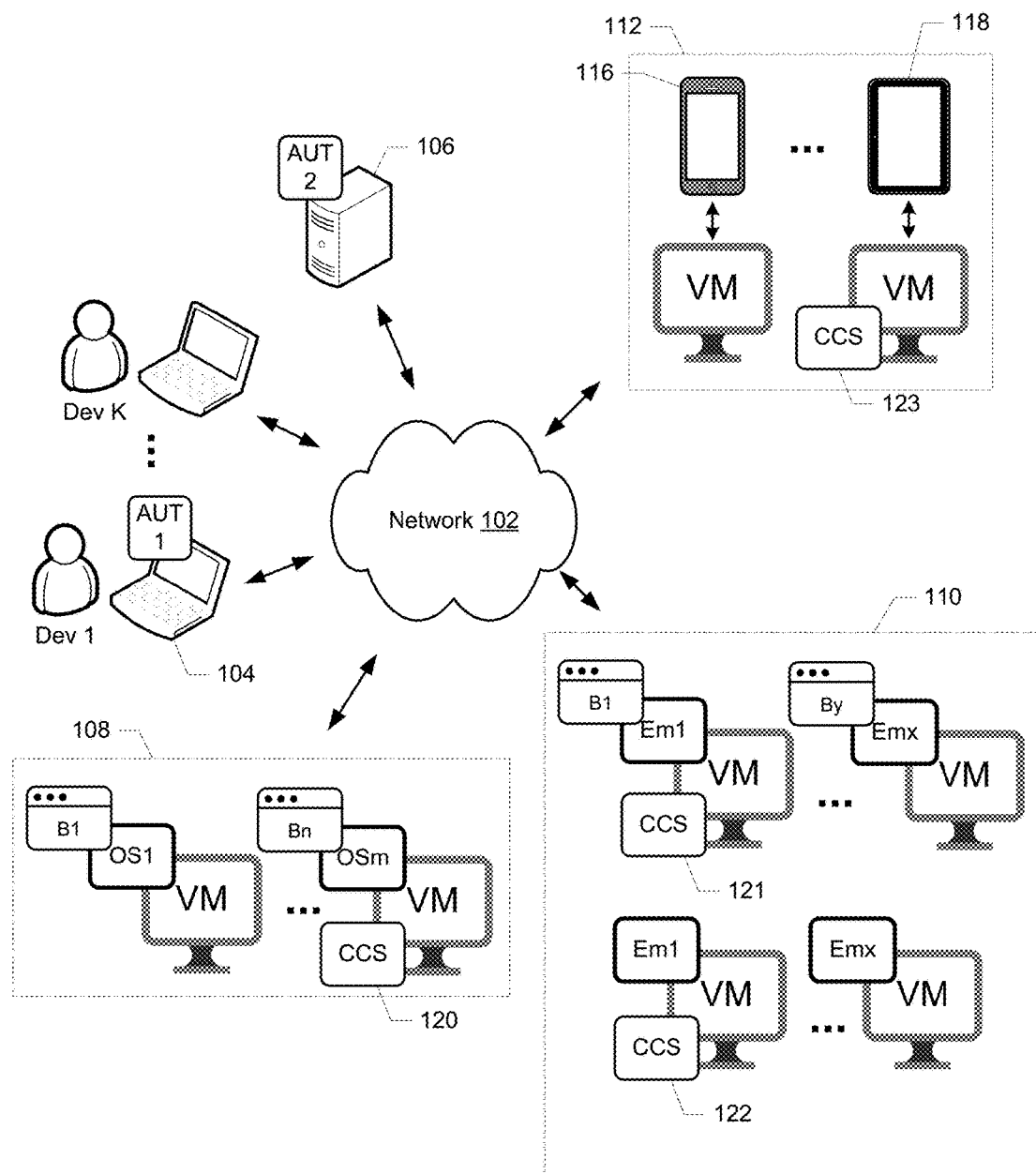
FIG. 1 is a simplified diagram of a computing system in which implementations enabled by the present disclosure may be practiced.

FIG. 1 depicts a computing environment in which application developers test their applications using resources on a cloud-hosted testing platform via network 102. Developers Dev 1 through Dev K represent a diverse community that may include anything from an individual developer on a single laptop to a team of developers on a WAN at a large enterprise. The AUTs may reside on the same machine with which the developer is interacting with the test platform (e.g., as represented by AUT 1 on laptop 104), or on a separate machine (e.g., as represented by AUT 2 on server 106). The AUTs may be hosted in the public cloud with minimal security, or behind the enterprise-grade security of an enterprise network.

The virtual and hardware resources of the application testing platform are depicted in FIG. 1 as being include in resource pools 108-112. Resource pool 108 represents resources for testing web applications on potentially hundreds of browser and operating system (OS) combinations as represented by various combinations of browsers B1-Bn and operating systems OS1-OSm on corresponding virtual machine (VM) instances. These VM instances may represent, for example, Windows, Mac, and Linux-based machines to name some representative examples.

Resource pool 110 represents resources for testing mobile web applications on potentially hundreds of mobile browser and mobile device emulator combinations as represented by various combinations of mobile browsers B1-By and emulators Em1-Emx on corresponding VM instances, and resources for testing native mobile applications on potentially hundreds of mobile device emulators as represented by emulators Em1-Emx on corresponding VM instances. The depicted emulators may represent, for example, iOS Simulators and Android Emulators to name some representative examples. And while the emulators are showns as operating on corresponding VMs, the developer will typically primarily interact with or automate on the emulators.

Resource pool 112 represents resources for testing both mobile web applications and native mobile applications on potentially hundreds of hardware mobile device types as represented by smart phone 116 and tablet 118 and the corresponding VM instances that manage the interaction with a corresponding mobile device during testing. The depicted devices may represent, for example, physical phones or tablets for Android and iOS to name some representative examples.

It should be noted that the test platform of FIG. 1 and other examples described herein show the use of VMs for exemplary purposes. It will be understood that other mechanisms for providing isolation among applications operating in a shared computing environment are contemplated to be within the scope of the present disclosure. Such other mechanisms include, for example, containers such as those provided by Docker, Inc., or CoreOS, Inc., both of San Francisco, Calif. The present disclosure will refer generally to VMs, containers, and other suitable mechanisms for providing isolation among applications in a computing environments as "virtual computing environment instances" or "VCEs." The present disclosure should therefore not be limited by reference to specific examples using VMs.

The platform supports a wide range of application testing use cases. A single developer might use the platform to manually run a single test of an AUT with one combination of testing resources. At the other end of the scale, a team of developers associated with a large enterprise can implement an automated testing framework at scale, running multiple tests of multiple AUTs on many different combinations of testing resources simultaneously. And depending on the AUT and the goals of a particular test, there may be one or many instances of the AUT with which the platform interacts for that test. And as will be discussed, the platform may include control/capture services (e.g., CCS's 120-123 operating on respective VMs) that are capable of connecting with, exerting varying degrees of control over, and/or capturing state information from the platform's testing resources and/or the AUTs for correlation with other test-related information.

As will be appreciated, the depiction of resource pools 108-112 is for illustrative purposes. More generally, the application testing platform may conform to any of a wide variety of architectures including, for example, one or more platforms deployed at one or more co-locations, each implemented with one or more servers. Network 102 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. The computing devices with which developers connect to the testing platform may be any suitable device capable of connecting to network 102 and interacting with the testing resources.

Some implementations enabled by the present disclosure are based on computing models that enable ubiquitous, convenient, on-demand network access to both virtual and hardware resources from one or more shared pools of computing resources (e.g., mobile devices, virtual machines, containers, emulators, networks, servers, storage, applications, services, etc.). Virtual resources are thoroughly torn down or wiped and hardware resources thoroughly wiped once testing is complete to ensure the security of each developer's data. As will be understood, such computing resources may be integrated with and/or under the control of the same entity controlling the testing platform. Alternatively, such resources may be associated with other platforms that are at least partially controlled by other entities, e.g., a platform under control of a separate provider of cloud services and/or computing resources with which the testing platform and/or the developer connects to consume resources as needed. In another example, a developer or an enterprise might run their own cloud or cluster of computing devices such as, for example, a Kubernetes cluster, the documentation for which is distributed by the Linux Foundation®. The diversity of other variations within the scope of this disclosure will be appreciated by those of skill in the art.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

Figure 2:
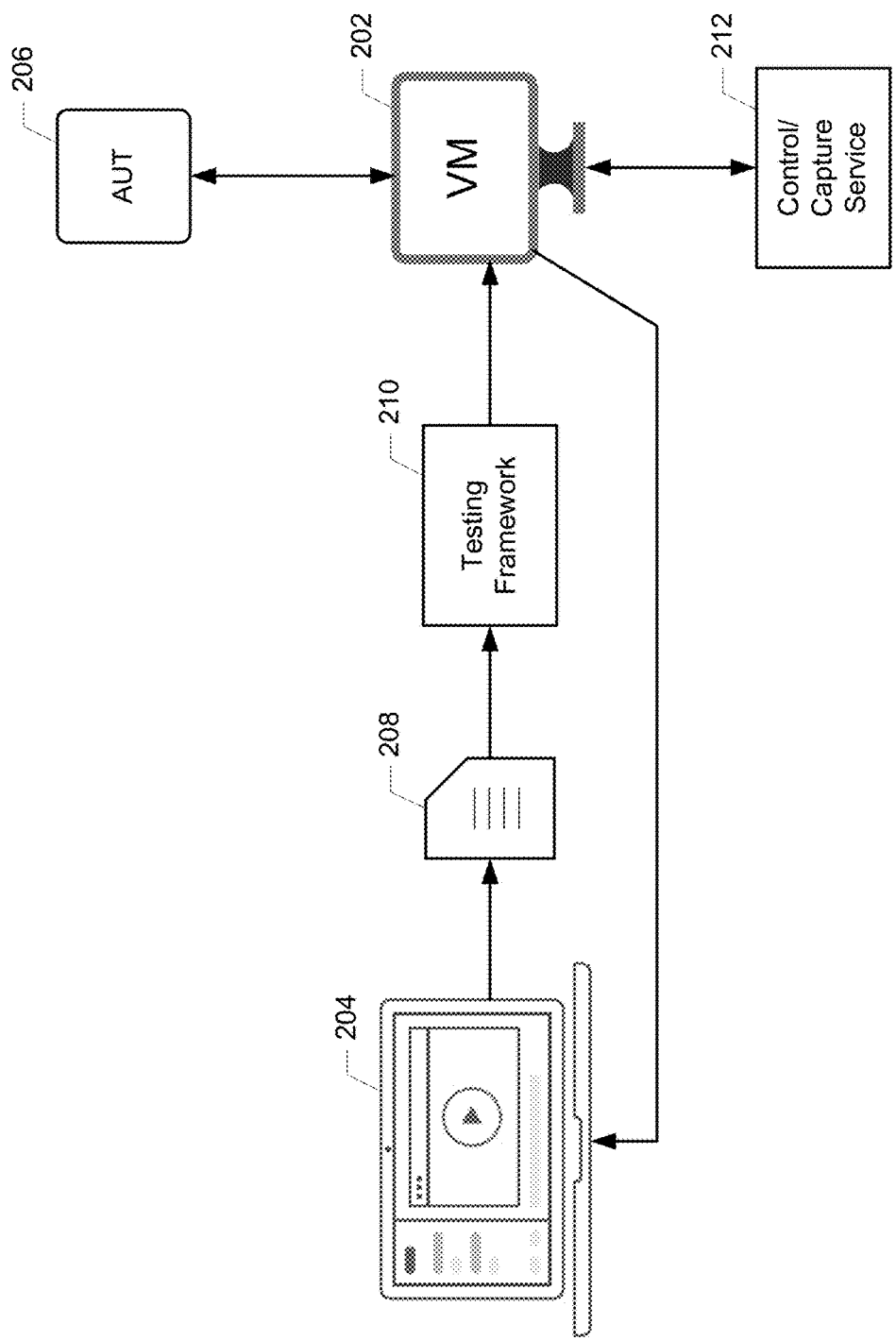
FIG. 2 illustrates interactions between a software developer and an application testing platform.
Figure 3:
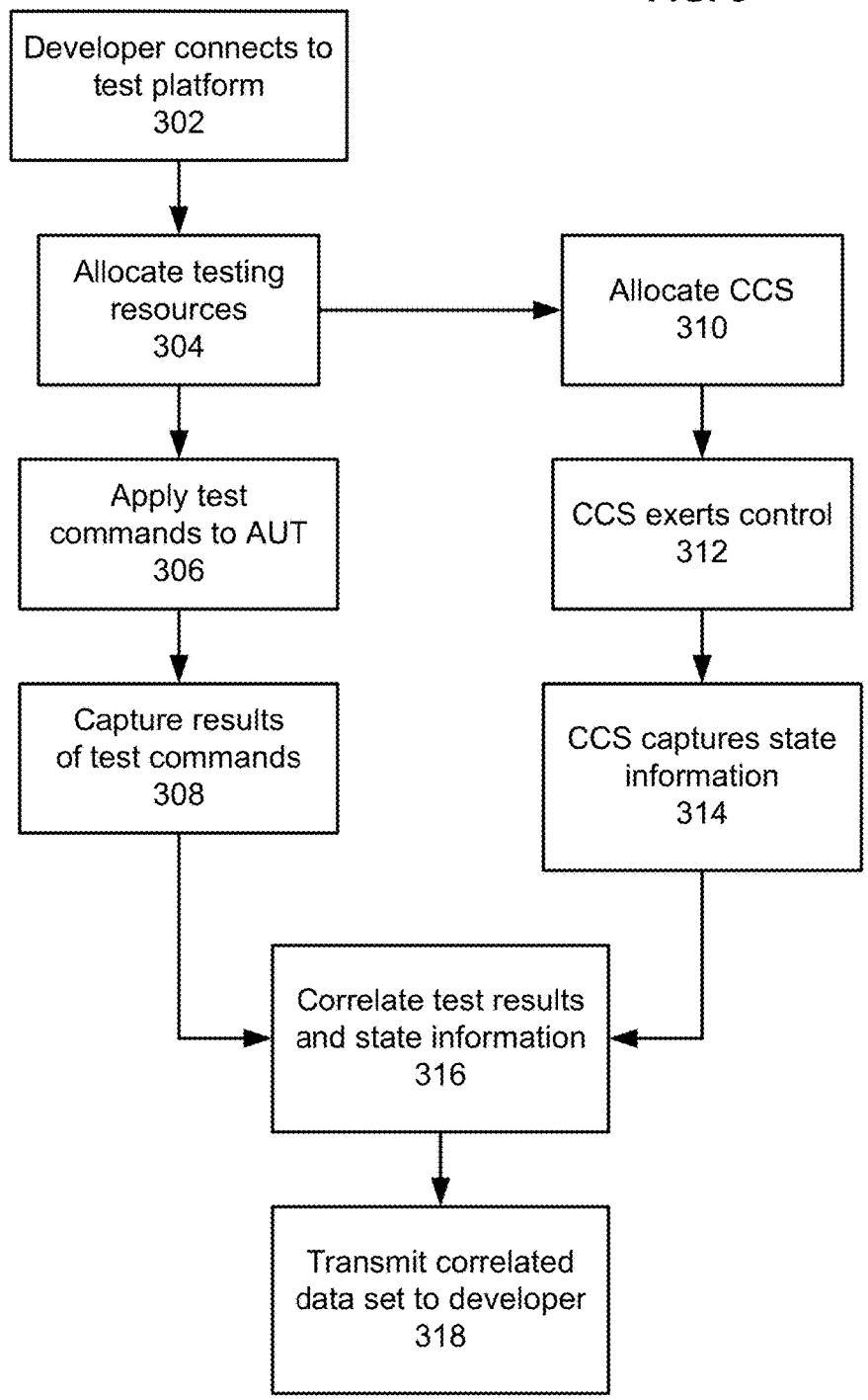
FIG. 3 is a flowchart illustrating operation of a particular implementation.

Referring now to the diagram of FIG. 2 and the flowchart of FIG. 3, a developer interacts with test resource(s) 202 (depicted in FIG. 2 as a VM instance) of a remote testing platform (302) via a test console interface (e.g., a web interface) on laptop 204 in which the developer can select the types of resource(s) with which an AUT 206 is to be tested. In response to the developer's selections, test resources 202 are allocated to that developer's test(s) (304). Interaction with test resources 202 may also be facilitated via a programmatic interface, e.g., a REST interface, (not shown) that might be used, for example, in the context of large-scale, automated testing. The developer develops test script 208 for the AUT in any of a variety of common languages (e.g., Ruby, PHP, JavaScript, or .NET), and the test commands are applied to AUT 206 (306) via VM instance 202 using any of a variety of automation software and/or testing frameworks (e.g., 210) including, for example, various automation drivers, Selenium and WebDriver for web application testing, and Appium, Espresso, XCUItest (Xcode), and Robotium for mobile application testing, etc.

The test scripts may be run on the developer's machine/network, on a remote machine (e.g., a continuous integration/continuous development (CI/CD) system), or by a remote service. The resulting commands are sent to the selected resources via a secure, two-way proxy server connection (e.g., a secure HTTP tunnel). There is also a secure two-way connection via proxy server from the selected testing resources to the AUT, wherever that resides. For example, if the AUT is a web application, VM instances with various browser/OS combinations specified by the developer are allocated from a pool or, if not available, instantiated. Secure HTTP tunnels to both the developer's machine and the AUT are established for each VM. Selenium commands generated by the developer's test script are applied (e.g., via an external driver) to each browser via one tunnel, and the browser then interacts with the AUT in a corresponding way via the other tunnel. As will be appreciated, while the use of highly secure connections may be preferable in some circumstances, implementations are contemplated in which different levels of security are used.

The results of the application of the test commands are captured (308) for eventual transmission back to the developer's device or network (as described below) for reviewing and/or further processing, e.g., via the test console interface. The captured test results may include the commands and responses (e.g., Selenium or Appium logs), as well as video or screen shots of the browser UI and/or AUT after each page-altering command. These results are correlated in time and stored (e.g., in cloud storage such as Amazon's Simple Store Service (S3) buckets) before the VM instance and any other resources are torn down or wiped. As discussed below, these test results may be supplemented with additional information captured via another connection.

According to various implementations enabled by the present disclosure, and as illustrated in FIG. 2, a CCS 212 is allocated (310) and interacts with one or more of the AUT and/or the allocated testing resources (e.g., the VM instance, container, browser, OS, emulator, mobile device, etc.) via another two-way connection to exercise control over (312) and/or capture information from (314) the testing resource (s) in a way that does not significantly interfere with the test(s) being conducted. For the purpose of clarity, CCS 212 is shown in the figure as being distinct from VM instance 202. However, it should be noted that, while such implementations are contemplated, implementations are also contemplated in which CCS 212 operates on the VM instance. An example will be instructive.

This example relates to a particular class of implementations and assumes that the AUT is a web application, that the testing resource of the testing platform is a particular browser/OS combination operating on a VM instance, and that the testing framework is an open source framework using a Selenium library. It will be understood however that these assumptions are merely for the purpose of illustration. For example, this class of implementations includes frameworks that don't necessarily need to use a Selenium library such as, for example, any framework based WebDriver, an interface that enables the remote control of web browsers as described in W3C Candidate Recommendation 14 Feb. 2018, the entire disclosure of which is incorporated herein by reference for all purposes. It should also be noted that, while only one test instance is shown, the described interactions among the components of the test system may be performed substantially simultaneously at scale across many test instances.

As will be appreciated, there is a significant amount of traffic between a browser and the servers with which it interacts, e.g., communications with remote assets via REST calls initiated by JavaScript embedded in the page html. Failures often relate to these communications rather than the logic of the page itself (e.g., the server never responds, responds after a timeout, or returns an error response). These types of failures contribute to what is commonly referred to as "test flake," i.e., intermittent failures due to the fact that test success or failure is not purely deterministic. As will also be appreciated, it is often difficult to determine whether a pattern of failures represents a real problem or can be safely ignored. Because of this, dealing with test flake represents a significant expenditure of troubleshooting resources and often results in arbitrary solutions, e.g., labeling something a failure only if it fails in some arbitrary way, e.g., twice in a row.

Browsers like Internet Explorer from Microsoft, Chrome from Google, Firefox from Mozilla, and Safari from Apple have associated application programming interfaces (APIs) that enable debugging functionality (e.g., using developer tools) and execution of automation commands (e.g., by automation drivers such as ChromeDriver or Geckodriver). Developer tools provide visibility on various browser communications and other performance data that can be accessed via a developer tools menu, e.g., by right-clicking on a page and selecting "Inspect" or "Inspect element." For example, a "Console" view provides a running list of requests (e.g., actions taken, links selected, etc.) and associated errors. In another example, a "Performance" view provides information about the use of various resources (e.g., network bandwidth, memory, CPU, etc.). Such "dev tools" are used by web developers to test and troubleshoot the pages of a web site under development. However, the use of these tools is typically limited to local testing by one developer using one browser on one web page at a time. Moreover, acquisition of the various types of information available in the dev tools menu is typically achieved through manual inspection by the developer. The test platform described above allows developers to perform tests of applications on many different browser/OS combinations simultaneously. However, as will be appreciated, this type of large-scale testing does not lend itself to the conventional, manual use of dev tools.

Conventional browser testing involves the execution of commands within a browser using, for example, an open source framework and the appropriate automation driver. In conjunction with this, and without interfering with the application of the test commands, a control/capture service (e.g., CCS 212) connects to the browser over a TCP interface that is defined in the dev tools protocol of the browser, controls use of the tools in specified ways, and captures information for correlation with the information in the test logs and/or screen shots or video of the browser interface. The information captured can relate to any of the information generated or made accessible by the browser engine (e.g., Blink for Chrome or Gecko for Firefox) using the dev tools interface defined by the dev tools protocol, e.g., back-end calls and responses, browser performance, memory usage, security audits, DOM tree snapshots, etc. The information captured can also include information made available by the VM or container itself such as, for example, CPU or memory usage, traffic across the NIC, etc. That is, in addition to conventional (e.g., Selenium-based) testing, the CCS allows the developer to access browser features or VM/container information in an automated way that allows more customized control of the browser or VM/container, and the collection of a much richer information set in connection with the tests being executed.

As mentioned above, web browser specifications provide for establishing high-level two-way interfaces for automating interaction with the browser using external drivers. A testing framework based on WebDriver uses such interfaces to apply test commands. Such interfaces allows for integration with the dev tools using such a two-way interface, e.g., the Chrome DevTools Protocol from Google allows for tools to instrument, inspect, debug, and profile Chrome browsers. Instrumentation is divided into a number of domains (e.g., DOM, debugger, network, etc.), each of which defines a number of commands it supports and events it generates. Similarly, the Mozilla debugging protocol allows an external service to connect to a Firefox browser, discover what sorts of things are present to debugging or inspection, select JavaScript threads to watch, and observe and modify their execution. The protocol provides a unified view of JavaScript, DOM nodes, CSS rules, and the other technologies used in web applications.

For older browser versions that only allow one connection to the internal browser debugging interface, a time-based multiplexer may be employed to allow WebDriver test commands and the control/capture service communications to occur during the same test. More current browser versions that allow multiple simultaneous driver connections do not require this.

The connection via the browser's API may be a two-way connection that allows the developer to control the browser in an automated way, e.g., to enable or disable specific browser functionality in conjunction with the tests they design (Selenium-based or otherwise). This may be done, for example, with a set of controls specified on the developer's test console interface that are then imposed in parallel with the tests at scale across all relevant browser/OS combinations and VM instances. When the tests are complete, the captured information is stored (e.g., uploaded to an S3 bucket like any other log file) and correlated in time with the other information generated by the tests (316), e.g., command/results and screen shots/video. All or some portion of this correlated data set may then be transmitted to the developer's device for presentation in any of a wide variety of ways (318).

As will be appreciated, there is a great diversity of browser control and information capture enabled by this automated integration with browser dev tools. For example, a developer can specify that a performance check should be conducted in conjunction with the application of a particular command or sequence of commands. The performance information generated by the browser can then be captured for manual review and/or support of a variety of functionalities. In another example, a network request made by the browser could be intercepted and/or the response modified (e.g., by redirecting or specifying a custom response). In another example, network capabilities of the target environment (mobile device or browser) could be emulated. In yet another example, CPU and other platform specific capabilities could be emulated. Information that might be captured includes, network events, application states (e.g., DOM tree), resource usage (e.g., CPU and I/O utilization on mobile devices), page lifecycles (e.g., timings on when something was loaded or intractable), etc. From these example, those of skill in the art will appreciate great diversity of the kinds of control and information capture enabled by the present disclosure.

Thus, according to this class of implementations, browser APIs are leveraged to harvest a rich information set, and make that information available to developers after tests across many browser instances are complete. The availability of this data supports correlating specific performance data with test success or failure, and flagging specific correlations to developers. For example, a correlation between the response times of back-end calls and success or failure might support a determination that a test fails only when a particular back-end call takes more than some period of time. In another example, multiple back-end calls might get fired off in parallel and there might be an order in which the responses are typically received (e.g., based on how processing intensive each is). However, occasionally, the responses might be received in a different order which causes a failure. The availability of the correlated information set as enabled by the present disclosure allows for the detection of this kind of dependency; a dependency that would otherwise be nearly impossible to detect in automated testing. As will be discussed, not only does this enable the behavior of a particular browser or testing resource to be surfaced, it also enables the abstraction of data across many instances.

The browser engines and dev tools APIs for mobile web browsers are similar to those for other computing devices, and so the control and capture functionality described above with reference to traditional (e.g., desktop/laptop) web browsers may be achieved in similar fashion. It should be noted, however, that there may be some cases in which additional measures need to be taken to facilitate the communications. For example, for a Chrome browser running on an Android operating system, the Android Debug Bridge (ADB) connection may need to be multiplexed between Chromedriver and the browser running in the emulator. More generally, and as will be appreciated, a specific browser and operating system combination (whether mobile or not) may require additional measures that are specific to the combination to achieve at least some of the control and capture functionality described herein, but which are within the skill of those in the art.

According to some implementations, access to a browser for the purpose of capturing test-related information may be achieved by mechanisms other than a browser API. For example, a CCS could be configured to interact with a browser in an automated way that mimics the types of interactions that a developer might have with the browser.

Another example relates to another class of implementations and assumes that the AUT is a native application for a mobile device, that the testing resource of the testing platform is the operating system of an actual hardware mobile device interacting with a VM instance or an emulator of a mobile device operating system on a VM instance, and that the testing framework is an open source framework using Appium. It will be understood however that these assumptions are merely for the purpose of illustration. For example, implementations in this class might use native libraries such as those associated with Xcode (from Apple) or Android debug bridge (ADB) to capture state information.

The same basic architecture and work flow illustrated in FIGS. 2 and 3 can be used to capture state information about a native application under test, whether the test resources correspond to an actual hardware mobile device or an emulator. Conventional automated test results can be acquired from the Appium logs. A control/capture service that facilitates generation and capture of a richer data set (e.g., CCS 212) may be implemented using integration tools that enable integration with OS automation engines such as, for example, those provided by Google (for Android) and Apple (for iOS).

Such integration tools and automation engines allow for the translation of test scripts to the lower level functionality of the mobile device OS for execution, and for the capture of detailed information (e.g., from Android or iOS logs) reflecting the state of the device, the OS, and/or the AUT. As will be appreciated, such information might include various types of performance data including processor and/or memory usage data. And as with the class of implementations described above for web applications, the information captured by this service may be correlated with other information (e.g., Appium test commands and/or results, video, screen shots, etc.) in a way that enables the developer to better understand the state of the AUT, the device OS, and/or allocated testing resources at various points in time as the automated test is performed.

Whether the test being performed relates to a web application, a mobile-web application, or a mobile native application, the captured information may be downloaded by the developer directly for review, and/or parsed by a dedicated service to support a variety of features that may be exposed via the test console interface.

For example, because the techniques described herein enable the generation of time-correlated data representing the state of the testing resources and/or the AUT at various points over the duration of the test, this enables a navigation functionality in which the developer can navigate (e.g., using a scrubber or other UI control) to any point in a test timeline, see the command being executed, the corresponding result, and any of the information captured via the service (e.g., via browser dev tools, mobile device integration tools, automation engines, etc.), all correlated in time; effectively amounting to a developer "time machine." This might include, for example, screen shots or video that show the state of the UI at any point in the test timeline correlated with commands/results and the corresponding state information. As will be appreciated, using the techniques enabled by the present disclosure, such "time machine" functionality may be provided in the context of a large-scale automated test platform, as well as for much simpler uses cases such as, for example, a single developer performing a local test on a browser or other application.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A platform, comprising one or more computing devices configured to:
   receive a request for initiation of a test of an application under test (AUT);
   allocate a plurality of resources for the test, the resources including a plurality of virtual computing environment instances, each virtual computing environment (VCE) instance corresponding to one of a plurality of device operating systems (OSs);
   establish a plurality of first two-way communication links, each of the first two-way communication links being between a corresponding one of the VCE instances and an instance of the AUT;
   establish a second two-way communication link between a first VCE instance and a control/capture service (CCS) associated with the automated test platform, the second two-way communication link being distinct from the first two-way communication link corresponding to the first VCE instance;
   receive a plurality of test commands via a third two-way communication link that is distinct from the first and second communication links;
   apply the test commands to each instance of the AUT using the corresponding VCE instance and the corresponding first two-way communication link;
   receive test results responsive to application of the test commands to each instance of the AUT with the corresponding VCE instance via the corresponding first two-way communication link;
   transmit control commands to the first VCE instance from the CCS via the second two-way communication link, the control commands being configured to control the first VCE instance via an application programming interface associated with the first VCE instance without interfering with application of the test commands to the corresponding instance of the AUT;
   receive state information with the CCS from the first VCE instance via the second two-way communication link, the state information resulting from application of the control commands to the first VCE instance, the state information representing one or more states associated with the first VCE instance and relating to the test of the corresponding instance of the AUT;
   for the first VCE instance, correlating the test commands, the test results, and the state information to generate a correlated data set for the first VCE instance; and
   store the correlated data set for the first VCE instance.

2. The platform of claim 1, wherein the first VCE instance also corresponds to a web browser configured to interact with the corresponding instance of the AUT, and wherein the state information includes a state of the web browser.

3. The platform of claim 2, wherein the first device OS is a personal computer OS and the web browser is configured to operate with the personal computer OS.

4. The platform of claim 2, wherein the one or more computing devices are configured to apply the control commands to the web browser and to receive the state of the web browser from the web browser via an application programming interface associated with the web browser.

5. The platform of claim 1, wherein the first device OS is a mobile device OS, and the first VCE instance also corresponds to a hardware device configured to operate with the mobile device OS.

6. The platform of claim 5, wherein the first VCE instance also corresponds to a web browser configured to interact with the corresponding instance of the AUT, and wherein the state information includes a state of the web browser.

7. The platform of claim 5, wherein the one or more computing devices are configured to apply the control commands to the web browser and to receive the state of the web browser from the web browser via an application programming interface associated with the web browser.

8. The platform of claim 5, wherein the AUT is a native application configured to operate with the mobile device OS, and wherein the state information includes one or both of a state of the native application or a state of the mobile device OS.

9. The platform of claim 5, wherein the state information includes one or both of a state of the hardware device or a state of the mobile device OS.

10. The platform of claim 1, wherein the first device OS is a mobile device OS, and the first VCE instance also corresponds to a mobile device emulator configured to emulate the mobile device OS.

11. The platform of claim 10, wherein the first VCE instance also corresponds to a web browser configured to interact with the corresponding instance of the AUT, and wherein the state information includes a state of the web browser.

12. The platform of claim 10, wherein the one or more computing devices are configured to apply the control commands to the web browser and to receive the state of the web browser from the web browser via an application programming interface associated with the web browser.

13. The platform of claim 10, wherein the AUT is a native application configured to operate with the mobile device OS, and wherein the state information includes one or both of a state of the native application or a state of the mobile device OS.

14. The platform of claim 10, wherein the state information includes one or both of a state of the mobile device emulator or a state of the mobile device OS.

15. The platform of claim 1, wherein the one or more computing devices are further configured to transmit a portion of the correlated data set to a remote developer device for presentation in a user interface of the remote developer device, wherein presentation of the correlated data set in the user interface of the remote developer device includes presentation of the test commands, the test results, and the state information of the correlated data set correlated at multiple points in time.

16. The platform of claim 1, wherein the first VCE instance is a virtual machine or a container.

17. A computer program product, comprising one or more non-transitory computer-readable media having computer program instructions stored therein, the computer program instructions being configured such that, when executed by one or more computing devices, the computer program instructions cause the one or more computing devices to:
    establish a first two-way communication link to a virtual computing environment (VCE) instance for use in conjunction with a test of an application under test (AUT), the test of the AUT being conducted via a second two-way communication link to the VCE instance, the VCE instance corresponding to a device OS, the second two-way communication link being distinct from the first two-way communication link;
    transmit control commands to the VCE instance via the first two-way communication link, the control commands being configured to control the VCE instance via an application programming interface associated with the VCE instance without interfering with application of test commands to the AUT;
    receive state information from the VCE instance via the first two-way communication link, the state information resulting from application of the control commands to the VCE instance, the state information representing one or more states associated with the VCE instance and relating to the test of the AUT;
    correlate the state information with test commands and test results transmitted via the second two-way communication link to generate a correlated data set; and
    store the correlated data set.

18. The computer program product of claim 17, wherein the VCE instance also corresponds to a web browser configured to interact with the AUT, and wherein the state information includes a state of the web browser.

19. The computer program product of claim 17, wherein the device OS is a mobile device OS, and the VCE instance also corresponds to a hardware device configured to operate with the mobile device OS.

20. The computer program product of claim 17, wherein the device OS is a mobile device OS, and the VCE instance also corresponds to a mobile device emulator configured to emulate the mobile device OS.

21. The computer program product of claim 17, wherein the computer program instructions are further configured to transmit a portion of the correlated data set to a remote developer device for presentation in a user interface of the remote developer device, wherein presentation of the correlated data set in the user interface of the remote developer device includes presentation of the test commands, the test results, and the state information of the correlated data set correlated at multiple points in time.

22. The computer program product of claim 17, wherein the VCE instance is a virtual machine or a container.

* * * * *